United States Patent [19]

Krispler et al.

[11] Patent Number: 5,042,609
[45] Date of Patent: Aug. 27, 1991

[54] CHASSIS FOR A MOTORCYCLE

[75] Inventors: Walter Krispler; Reinhold Widl, both of Adnet, Austria

[73] Assignee: Emco Maier Gesellschaft m.b.H., Hallein, Austria

[21] Appl. No.: 508,851

[22] Filed: Apr. 12, 1990

[30] Foreign Application Priority Data

Apr. 19, 1989 [EP] European Pat. Off. .......... 89107052

[51] Int. Cl.$^5$ ............................................ B62K 11/00
[52] U.S. Cl. .................................... 180/219; 280/275
[58] Field of Search ............... 280/275, 276, 277, 270, 280/283, 285, 286; 180/219

[56] References Cited

U.S. PATENT DOCUMENTS

| | | | |
|---|---|---|---|
| 4,180,280 | 12/1979 | Doveri | 280/286 X |
| 4,431,204 | 2/1984 | Miyakoshi et al. | 280/277 |
| 4,756,547 | 7/1988 | Trema | 180/219 X |
| 4,785,905 | 11/1988 | Trema | 180/219 |

*Primary Examiner*—Charles A. Marmor
*Assistant Examiner*—Alan M. Kagen

[57] ABSTRACT

In a chassis for a motorcycle including a frame with means for holding a rear wheel, a single pronged swing arm is connected to the forward area of the frame for pivotal movement about a pivot axis parallel to the axis of the rear wheel, with the swing arm near its free forward end being connected to a hub carrier for supporting a forward wheel, a steering mechanism with a handle bar carrier pivotally connected to the frame and a steering linkage with at least two hinge axes perpendicular to one another and to the pivot axis of the handle bar carrier, and a spring and damping device arranged between the swing arm and the frame for damping the movement of the wing, the hub carrier being supported on a stub axle connected with the swing arm for movement about a pivot axis perpendicular to the stub axle, which pivot axis of the hub carrier relative to the stub axle lies in a plane normal to the axis of the forward wheel and located in the middle of the forward wheel with said pivot axis of said hub carrier relative to said stub axle passing through the forward wheel axis.

7 Claims, 4 Drawing Sheets

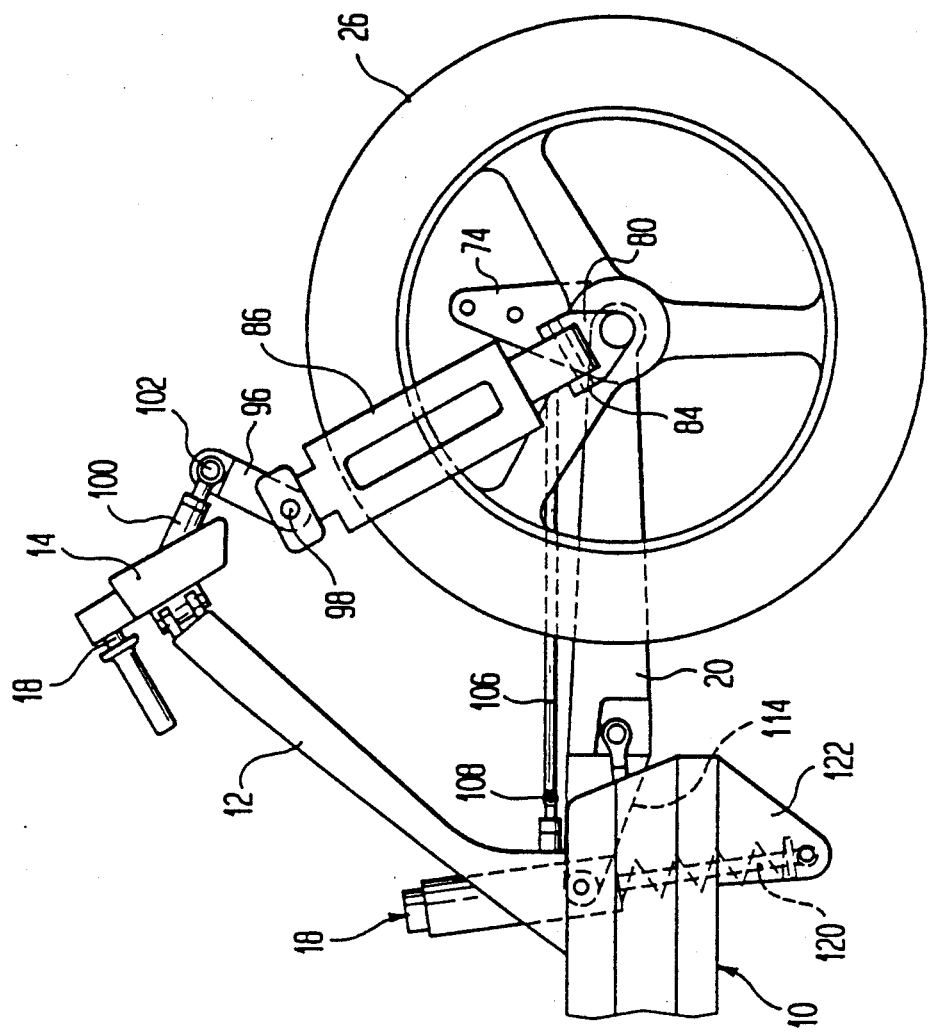
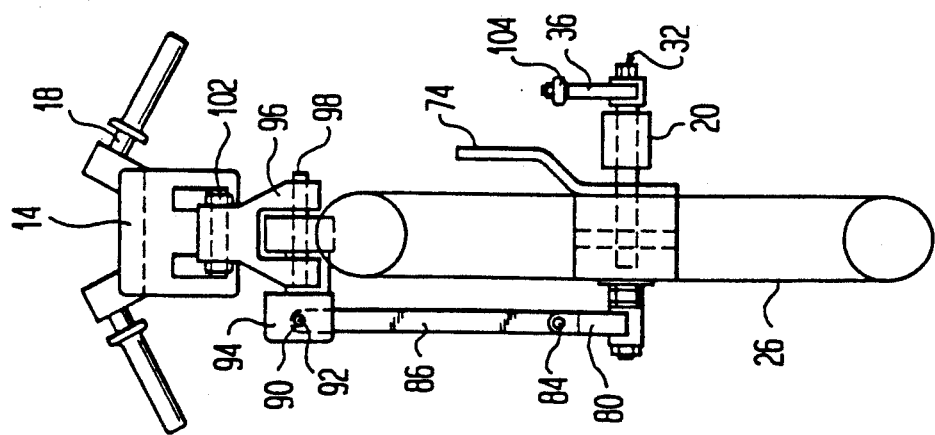
Fig. 4
Fig. 3

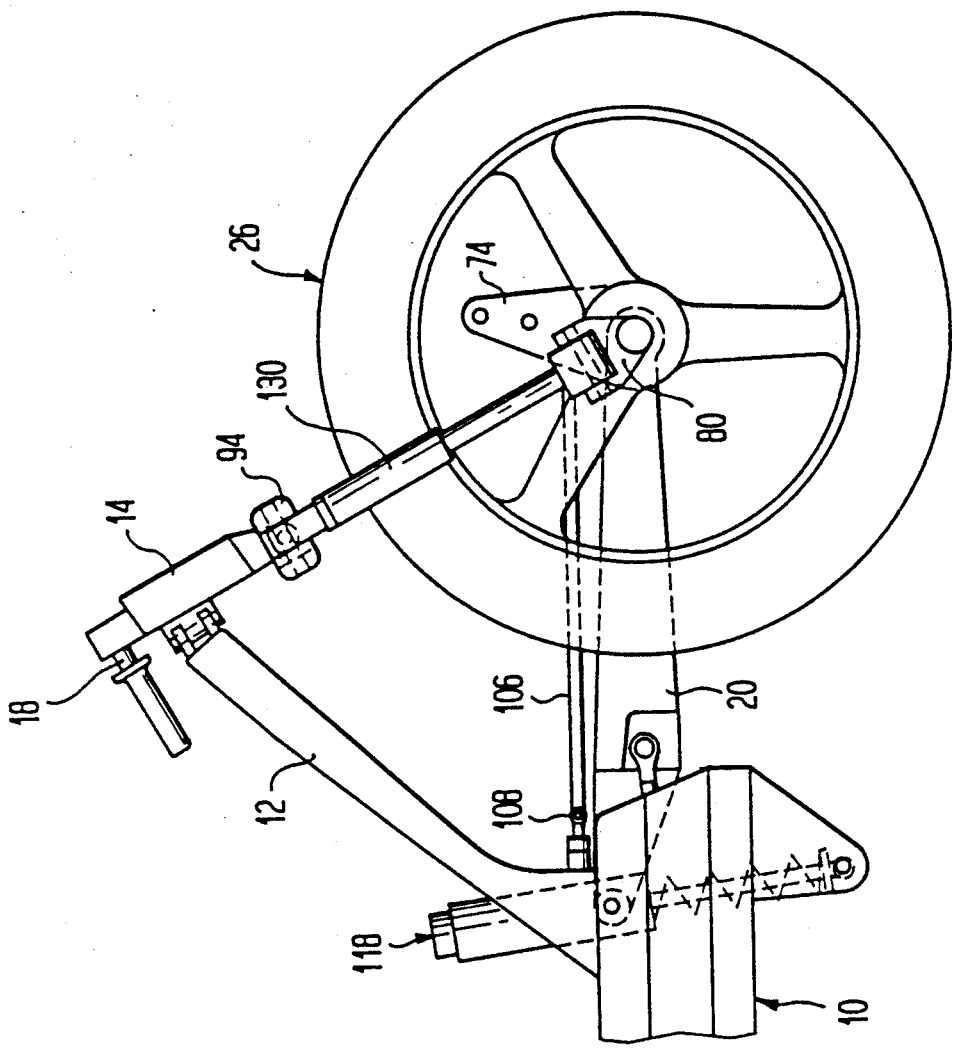
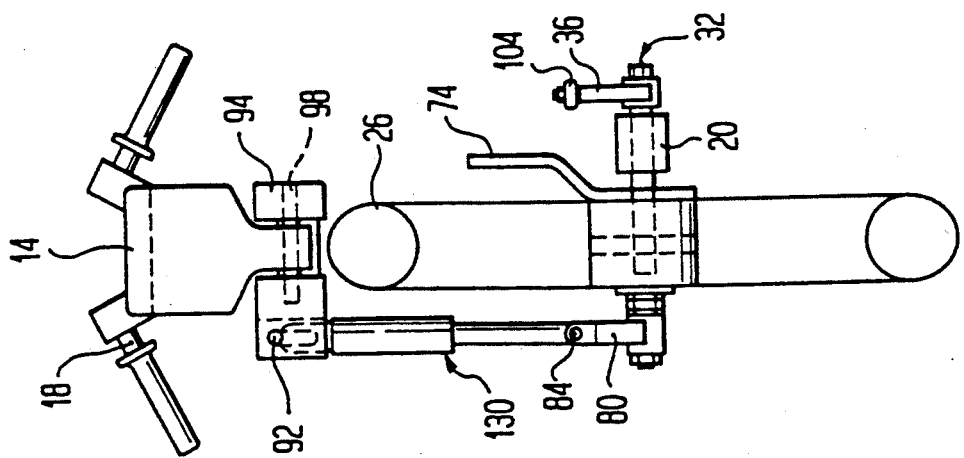
Fig. 6
Fig. 5

CHASSIS FOR A MOTORCYCLE

BACKGROUND OF THE INVENTION

The invention concerns a chassis for a motorcycle including a frame with means for holding a rear wheel, a single pronged swing arm pivotally joined to the frame at the lower forward end thereof for pivotal movement about a pivot axis parallel to the axis of the rear wheel and which swing arm near its forward free end is connected with a hub carrier for supporting a forward wheel, a steering mechanism with a handle bar carrier pivotally supported on the frame and a steering linkage with at least two hinge axes perpendicular to one another and to the pivot axis of the handle bar carrier, and a spring and damping mechanism between the swing arm and the frame for damping the movement of the swing arm.

In a chassis of the aforementioned type, known from U.S. Pat. No. 4,526,249, the hub carrier is rigidly connected with an arm of the steering linkage. This arm is provided near the hub carrier with an extension directed toward the frame and connected by a ball joint to the forward end of the swing arm. Connected by another ball joint to the upper end of this steering linkage arm, lying above the forward wheel, is a second swing arm hingedly connected to the frame, so that the two swing arms, the frame and the steering linkage arm form a hinged four-cornered structure. The steering axis runs through the two ball joints and its position is so selected that its trace point, that is the intersection point of the steering axis with the ground, lies in front of the engagement point of the wheel with the ground and therefore produces a wheel position stabilizing caster.

The invention has as its object the provision of a chassis of the aforegoing type which is compact and simple in its construction and which assures an improved stabilization of the forward wheel.

This object is achieved in accordance with the invention in that the hub carrier is supported on a stub axle carried by the swing arm, in that the hub carrier is pivotable about a pivot axis perpendicular to the stub axle which pivot axis lies in a plane normal to the axis of the forward wheel and located in the forward of the middle wheel, and in that said pivot axis passes through the axis of the forward wheel.

In the chassis of the invention, the steering point of the chassis lies exactly in the middle of the forward wheel, whereas in the above described known arrangement the steering axis is displaced from the wheel middle point toward the frame. With the same inclination angle of the steering axis (as in the mechanism of the invention) this displacement reduces the possible caster and therefore lessens the stabilization effect arising from the caster. At the same time, the chassis of the invention is extremely simple in its construction. For the same caster as in the known mechanism the arrangement of the invention permits a compact construction of the motorcycle, since the forward wheel in comparison to the known arrangement can be moved rearwardly closer to the frame.

Preferably, the stub axle is rotatably supported in the swing arm for rotation about its longitudinal axis and is non-rotatably connected with a lever which in turn is connected through a double link with the frame so that the swing arm, the lever, the double link and the frame form a hinged parallelogram. It is thereby assured that in the case of spring resisted movement of the swing arm the steering axis retains its direction in space. According to a material feature of the present invention, the length of the double link can be adjustable so that the angle the steering axis forms with the vertical or horizontal plane is adjustable.

According to the construction of a very simple embodiment of the invention, the portion of the stub axle received in the hub carrier is flattened and received in a slot shaped recess running parallel to the axis of the barrel shaped hub carrier, which recess is of a "V"-shape which widens in the direction toward the fixed end of the stub axle, and in that the hub carrier and the stub axle are connected with one another by a bolt directed perpendicularly to the flat sides of the stub axle and to the walls of the slot which are parallel to the flat sides of the stub axle with the bolt passing diametrically through the hub carrier. The bolt is consequently pivotal along with the stub axle about the longitudinal axis of its stub axle. The hub carrier is pivotal about the bolt axis to the extent permitted by the slot-shaped recess. The barrel-shaped hub carrier, on the other hand, has bearing surfaces on its circumference for supporting the forward wheel.

To permit an up and down movement of the swing arm, the steering linkage must be adjustable in its length. This can be achieved in a known way in that the steering linkage includes either a knee joint or a telescoping arrangement, as explained in more detail hereinafter.

Preferably, the swing arm has a section thereof extending rearwardly from its pivot axis and engaging a part (cylinder, piston rod) of a spring leg whose other part (piston rod, cylinder) is supported by the frame. In this way, jolts applied by the street to the forward wheel are not conducted through the steering linkage to the handle bar carrier and then to the handle bars, but are instead directly conducted through the lower part of the frame to the frame.

Further features and advantages of the invention will be apparent from the following description which explains the invention by means of exemplary embodiments in conjunction with the accompanying figures.

BRIEF DESCRIPTION OF THE DRAWINGS

FIG. 3 is a front view of the arrangement of FIGS. 1 and 2.

FIG. 4 is a side view of the forward side of the motorcycle of FIG. 1 but taken from the side opposite to that of FIG. 1.

FIGS. 5 and 6 are views similar FIGS. 3 and 4 but show a motorcycle comprising a second embodiment of the invention.

DETAILED DESCRIPTION OF THE PREFERRED EMBODIMENTS

Figure 1:
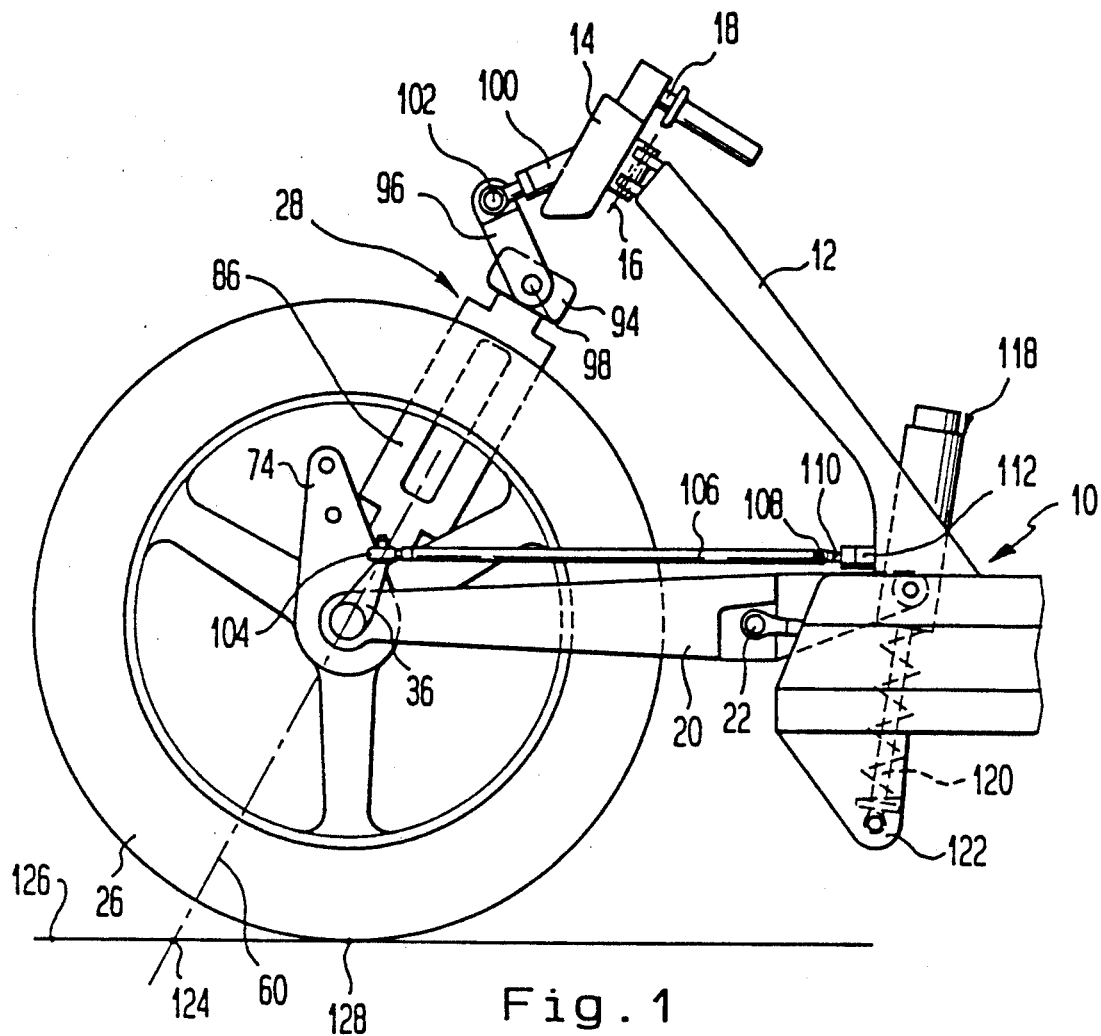
FIG. 1 is a partially schematic side view of the forward section of a motorcycle embodying the invention.

In FIG. 1, reference numeral 10 indicates the frame of a motorcycle, of which in FIG. 1 only the forward half is shown. On the forwardly and upwardly inclined prow 12 of the frame 10 is a handle bar carrier 14 joined to the prow for pivotal movement about a pivot axis 16.

The handle bar carrier 14 is rigidly connected to a handle bar 18.

A swing arm 20 is pivotally connected to the forward lower end of the frame 10 by means of a hinge 22 (FIGS. 1 & 2), so that it can be swung up and down. The single pronged swing arm 20 holds at its forward free end, in a way to be hereafter described in more detail, a hub carrier, indicated generally at 24, on which the forward wheel 26 is supported and which is connected to the handle bar carrier 14 by a steering linkage indicated generally at 28.

The mounting of the hub carrier 24 on the swing arm 20 is next described with reference to FIG. 7. A stub axle 32 is rotatably supported in the swing arm 20 by two bearings 30. A lever 36 is pushed onto a section 34 of the stub axle which extends to the right in FIG. 7 out of the swing arm 20, the lever being non-rotatably connected to the stub axle 32 by a key 38. The lever 38 is secured by a nut 40. The function of the lever 36 is explained later in more detail.

Figure 7:
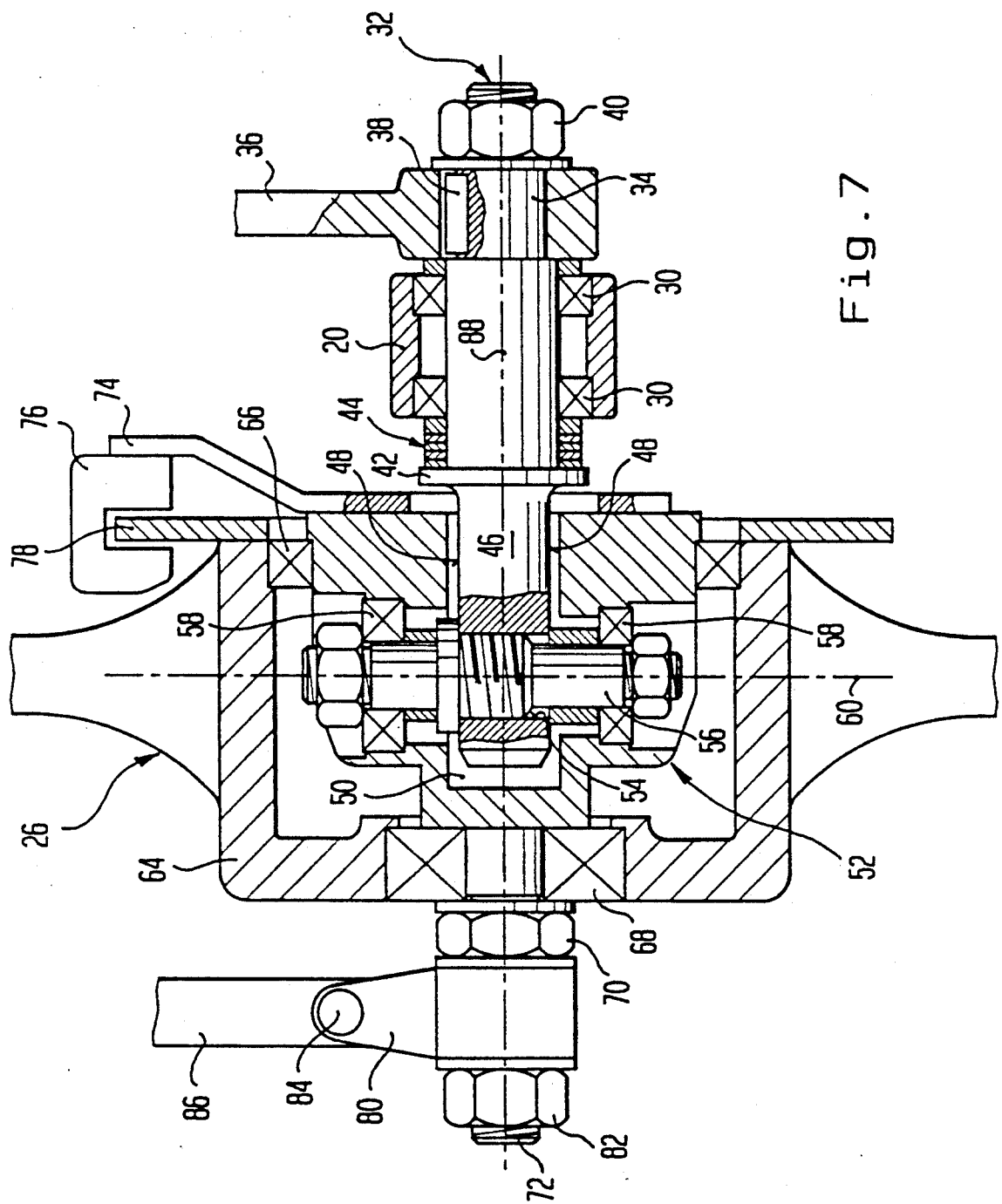
FIG. 7 is a partially schematic section taken on a plane containing the wheel axis and passing through the stub axle, the hub carrier and the forward wheel hub of the motorcycles of FIGS. 1-6.

On the section thereof which extends in FIG. 7 leftwardly out of the swing arm 20, the stub axle 32 has a flange 42. Between this flange and the swing arm 20 are spacer disks 44 by means of which the axial position of the stub axle 32 in the swing arm 20 can be adjusted.

Figure 2:
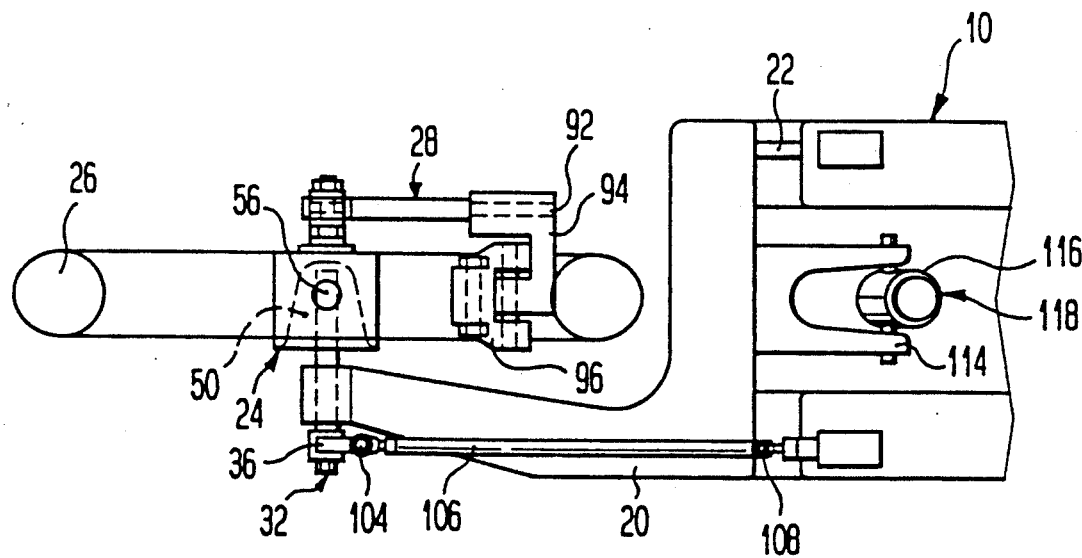
FIG. 2 is a plan view of the arrangement of FIG. 1.

Leftwardly from the flange 42 and connected with it, the stub axle has a section 46 having a flattened shape including two parallel flat surfaces 48. This section 46 of the stub axle 32 is received in a slot-shaped recess 50 of a barrel-shaped hub carrier 52. In plan view, the recess 50 has a nearly "V"-shaped form, as can be seen in FIG. 2. The section 46 of the stub axle has a bore 52 directed perpendicularly to the surfaces 48 through which a bolt 56 extends, on which bolt the hub carrier 52 is supported for pivotal movement about the bolt axis 60 by bearings 58. The angular amount of pivotal movement permitted is determined by the play of the stub axle 32 in the recess 50.

The cup shaped wheel hub 64 of the forward wheel 26 is rotatably supported on the hub carrier 52 by means of bearings 66 and 68 and is secured by means of a nut 70 threaded onto an axle 72 connected with the hub carrier 52. On its side facing the swing arm the hub carrier 52 is rigidly connected to a brake caliper carrier 74 carrying the caliper 76, illustrated only schematically, of a disk brake. This caliper overlaps a brake disk 78 non-rotatably connected to the wheel hub 64.

The steering linkage indicated generally at 28 includes a lower lug 80 rotatably supported on the axle 72 and secured to it by a nut 82. The lug 80 is hingedly connected to an intermediate linkage section 86 by a hinge 84 with the axis of the joint 84 being directed perpendicularly to the longitudinal axis 88 of the stub axle 32 and to the axis 16 of the bolt 56. The intermediate linkage section 86 is hingedly connected at its upper end to one leg of a "U"-shaped intermediate piece 94, by a second hinge 90 (FIG. 3) having a hinge axis 92 parallel to the axis of the hinge 84. With its other leg, the "U"-shaped intermediate piece 94 extends between the legs of a fork piece 96 to which it is hingedly connected by a hinge bolt 98 oriented parallel to the wheel axis. The fork piece 96 is pivotally connected with its other end to two lugs 100 for pivotal movement about an axis 102 parallel to the hinge bolt 98. The lugs 100 are rigidly connected with the handle bar carrier 14 (FIG. 1). The knee joint formed by the lugs 100 and the fork piece 96 permits a change in length of the steering linkage when the swing arm 20 swings up and down.

The free end of the lever 36 is hingedly connected to one end of a double link 106 by means of a ball joint 104, which double link 106 has its other end connected to a pin 110 by a hinge 108, the pin being axially adjustably received in a bushing 112 fixed to the frame. The axial adjustment can, for example, be accomplished by an axially fixed but rotatable nut threadably engaged with external threads on the pin 110. The double link 106, the swing arm 20, the lever 36 and the part of the frame lying between the hinges 108 and 22 together form a hinged four cornered structure such that in the event of a movement of the swing arm 20 the direction of the lever 36, and therewith also the direction of the bolt 56 non-rotatably connected with it remain unchanged. As can be easily seen, an adjustment of the pin 110 effects an adjustment of the angle of the hinged four cornered structure and therewith the inclination of the bolt axis 60. In place of the adjustment of the pin 10, an adjustment capability can be provided by means of which the length of the double link 106 can be changed.

The swing arm 20 carries a fork 114 on its side facing the frame 10, which fork with its fork prongs hingedly receives the cylinder 116 of a spring leg 118 which with its piston rod 120 engages a carrier 122 fixed to the frame. In this way, the swinging movements of the swing arm 20 are spring resisted and damped. Jolts coming from the street and applied to the swing arm 20 through the forward wheel 26 are thereby conducted directly to the frame at least near to the center of gravity of the motorcycle and have no influence on the handle bars 18. The negative influence of such forces on the driving condition and steerability of the motorcycle can therefore be reduced to a minimum.

In the so far described motorcycle, the steering movement of the handle bars 18 effects a pivoting of the wheel, through the steering linkage 28, about the axis 60 of the bolt 56 so that depending on the inclined position of the axis 60, which lies in the middle plane of the wheel, the forward wheel leans toward the right or left. The steering middle point lies exactly in the center of the forward wheel 26. Since the steering axis 60 passes through the axis of the forward wheel 26, a greater spacing results between the intersection point 124 of the forwardly elongated steering axis 60 with the ground 126 and the point of engagement 128 between the forward wheel 26 and the earth 126. This spacing is designated as caster and assures self centering, that is the automatic return of the forward wheel 26 to the position corresponding to straight ahead travel. The motorcycle of the invention in this way receives a strong moment for automatically returning the motorcycle to an upright position and for returning it to straight ahead travel after executing a curve.

It will be further understood, especially from FIG. 7, that the forward wheel 26 can be quickly demounted and mounted in an extremely simple way which is of great advantage in the case of racing machines. It is sufficient for the removal of the forward wheel 26 from the hub carrier 52 to remove both of the nuts 82 and 70, and to remove the brake caliper 76 from the brake caliper carrier 74.

It will be further understood that without great difficulty it is possible to connect a brake caliper carrier non-rotatably to the hub carrier 52 on the side of the forward wheel facing away from the swing arm 20, and to also provide a brake disk on the other side of the forward wheel 26, to apply two disk brakes to the forward wheel.

The embodiment according to FIGS. 5 and 6 differs from the previously described embodiment solely by a somewhat different form of the steering linkage. The middle linkage section is not rigid as it is in the first embodiment, and instead it is formed by a telescoping arrangement 130 by means of which a change in length of the steering linkage is possible in the case of a pivotable movement of the swing arm 20. Therefore, the knee joint formed from the parts 100 and 96 is unnecessary. The intermediate piece 94 is directly hinged to the handle bar carrier 14.

We claim:

1. A chassis for a motorcycle, said chassis comprising a frame with means for supporting a rear wheel for movement about a pivot axis relative to said frame and having a forward area, a single pronged swing arm hingedly connected to said forward area of said frame for pivotal movement about a swing arm pivot axis parallel to said pivot axis of the rear wheel, said swing arm having a free forward end connected with a hub carrier for supporting a forward wheel, said forward wheel having a central axis fixed relative to said hub carrier and about which it rotates relative to said hub carrier and also having a middle plane normal to said central axis, a steering mechanism with a handle bar carrier pivotally connected to the frame for movement relative to the frame about a handle bar carrier axis, and a steering linkage with at least two hinge axes perpendicular to one another and perpendicular to said handle bar carrier pivot axis, and a spring and damping apparatus operable between the swing arm and the frame for damping movement of the swing arm relative to the frame about said swing arm pivot axis, said hub carrier being pivotally supported for pivotal movement relative to a stub axle, connected to the swing arm, about a hub carrier pivot axis perpendicular to the swing arm, which hub carrier pivot axis lies in said middle plane of said forward wheel, said hub carrier pivot axis passing through said central axis of said forward wheel.

2. A chassis as defined in claim 1 further characterized in that said stub axle is rotatably supported by said swing arm for rotation about its longitudinal axis and is non-rotatably connected with a lever, which lever on its other side is connected through a double link with said frame so that said swing arm, said lever, said double link and said frame form a hinged four cornered structure.

3. A chassis as defined in claim 2 further characterized in that the length of said double link or the position of at least one of its hinges in the longitudinal direction of the double link is adjustable.

4. A chassis according to claim 1 further characterized in that said stub axle has a portion thereof received in said hub carrier and flattened so as to have two parallel flat surfaces, said stub axle portion being received in a recess of the hub carrier running parallel to said central axis of the forward wheel, said recess having two walls parallel to said flat surfaces of said stub axle and having a "V"-shape widening toward the end of the stub axle supported by said swing arm, and in that the hub carrier and the stub axle are connected with one another by a bolt passing diametrically through the hub carrier and through the stub axle perpendicular to said flat surfaces of the stub axle and to said walls of said recess which are parallel to the flat surfaces of the stub axle.

5. A chassis according to claim 1 further characterized in that the steering linkage includes a knee joint.

6. A chassis according to claim 1 further characterized in that the steering linkage includes a telescopic section.

7. A chassis according to claim 1 further characterized in that the swing arm has a portion extending rearwardly from its pivot axis with said frame which rearwardly extending portion engages one part (cylinder, piston rod) of a spring leg whose other part (piston rod, cylinder) engages the frame.

* * * * *